(12) United States Patent
Jung et al.

(10) Patent No.: US 11,897,487 B2
(45) Date of Patent: Feb. 13, 2024

(54) SENSOR EVALUATION SYSTEM, SENSOR EVALUATION DEVICE, AND VEHICLE

(71) Applicant: TOYOTA JIDOSHA KABUSHIKI KAISHA, Toyota (JP)

(72) Inventors: Hojung Jung, Shizuoka-ken (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 343 days.

(21) Appl. No.: 17/470,263

(22) Filed: Sep. 9, 2021

(65) Prior Publication Data
US 2022/0185297 A1 Jun. 16, 2022

(30) Foreign Application Priority Data
Dec. 11, 2020 (JP) .................. 2020-206211

(51) Int. Cl.
| | |
|---|---|
| *B60W 40/04* | (2006.01) |
| *B60W 50/02* | (2012.01) |
| *G06T 7/73* | (2017.01) |
| *G01S 7/40* | (2006.01) |
| *G08G 1/01* | (2006.01) |

(Continued)

(52) U.S. Cl.
CPC ........ *B60W 50/0205* (2013.01); *B60W 40/04* (2013.01); *G01S 7/40* (2013.01); *G01S 7/497* (2013.01); *G06T 7/74* (2017.01); *G06V 20/56* (2022.01); *G08G 1/0112* (2013.01); *G08G 1/0116* (2013.01); *G06T 2207/30252* (2013.01)

(58) Field of Classification Search
CPC ..... B60W 50/0205; B60W 40/04; G06T 7/74; G06T 2207/30252; G06V 20/56; G01S 7/40; G01S 7/497; G08G 1/0112; G08G 1/0116
See application file for complete search history.

(56) References Cited

U.S. PATENT DOCUMENTS

| | | |
|---|---|---|
| 2015/0348416 A1 | 12/2015 | Fujita et al. |
| 2020/0111363 A1 | 4/2020 | Maeda et al. |

FOREIGN PATENT DOCUMENTS

| | | |
|---|---|---|
| JP | 2006-236094 A | 9/2006 |
| JP | 2014-191485 A | 10/2014 |

(Continued)

*Primary Examiner* — Mathew Franklin Gordon
(74) *Attorney, Agent, or Firm* — Dinsmore & Shohl LLP

(57) ABSTRACT

A sensor evaluation system includes an infrastructure device installed outside a vehicle, and an information processing device. The infrastructure device includes an infrastructure sensor that detects the environment around the infrastructure device, and an infrastructure information processing device that performs information processing. The infrastructure information processing device calculates first feature point position information indicating information on a position of a feature point in the environment around the infrastructure device, based on detection information of the infrastructure sensor. The information processing device calculates second feature point position information indicating information on a position of a feature point in the environment around the vehicle, based on the detection information of a sensor. The information processing device evaluates a function of the sensor based on a difference between the first feature point position information and the second feature point position information, which are associated with the same feature point.

12 Claims, 11 Drawing Sheets

(51) Int. Cl.
*G01S 7/497* (2006.01)
*G06V 20/56* (2022.01)

(56) References Cited

FOREIGN PATENT DOCUMENTS

| | | |
|---|---|---|
| JP | 2018-139084 A | 9/2018 |
| JP | 2020-083226 A | 6/2020 |
| WO | 2018/235154 A1 | 12/2018 |

SENSOR EVALUATION SYSTEM, SENSOR EVALUATION DEVICE, AND VEHICLE

CROSS-REFERENCE TO RELATED APPLICATION

This application claims priority to Japanese Patent Application No. 2020-206211 filed on Dec. 11, 2020, incorporated herein by reference in its entirety.

BACKGROUND

1. Technical Field

The present disclosure relates to a sensor evaluation system, a sensor evaluation device, and a vehicle, each of which evaluates a sensor which is provided in the vehicle and which is used for detecting an environment around the vehicle.

2. Description of Related Art

In order to improve an intelligent transport system (ITS), various technologies have been proposed to leverage information obtained from a device installed outside a vehicle in addition to a sensor provided in the vehicle.

Japanese Unexamined Patent Application Publication No. 2006-236094 discloses an obstacle recognition system in which a vehicle cooperates with a piece of infrastructure to detect obstacles on the road, and which is simple and inexpensive, and has improved recognition accuracy and speed. The obstacle recognition system includes a roadside imaging unit installed on a roadside so as to capture an image of the road, and a roadside transmission unit installed on the roadside to transmit roadside image data captured by the roadside imaging unit to the vehicle together with the characteristic information. Further, the obstacle recognition system includes a vehicle-side imaging unit mounted on the vehicle so as to capture an image of the road, and a storage unit, mounted on the vehicle, which stores and holds vehicle-side image data, captured by the vehicle-side imaging unit, in association with a time when the image is captured. Moreover, the obstacle recognition system includes a correction unit mounted on a vehicle for correcting the roadside image data transmitted by the roadside transmission unit together with the characteristic information based on the traveling state of the vehicle, and a recognition unit which extracts, from the storage unit, the vehicle-side image data, captured at the same timing as that of the corrected roadside image data obtained by the correction unit, and detects and recognizes the obstacle from the extracted vehicle-side image data and the corrected roadside image data.

SUMMARY

Accurately estimating a position of a vehicle with respect to the environment around the vehicle (including but not limited to preceding vehicles, lanes, and obstacles) is important in terms of properly executing various controls of the vehicle, such as autonomous travel control and collision mitigation braking. In particular, the autonomous travel control is significantly affected by performance of a self-position estimation function.

The position of the vehicle with respect to the environment around the vehicle is estimated based on detection information of a sensor provided in the vehicle and is used for detecting the environment around the vehicle. Consequently, in a case where the sensor is insufficiently calibrated due to misalignment of a mounting position, or the sensor malfunctions due to age deterioration, it is likely to cause a decline in accuracy of the vehicle position estimation, and thus a decrease in control performance.

However, such a decline in sensor function and a decrease in control performance may barely be recognized unless deterioration actually manifests in behavior of the vehicle under control.

This is because determination of whether constant detection information of the sensor provided in the vehicle is correct can be performed by the vehicle only, and thus control is executed on the basis of the determination made by the vehicle. In particular, the autonomous travel control is executed assuming that the correct position of the vehicle on a map is estimated by the self-position estimation function.

The present disclosure provides a sensor evaluation system, a sensor evaluation device, and a vehicle, each of which is capable, without observing behavior of the vehicle, of consecutively performing function evaluation of the sensor which is provided in the vehicle and which is used for detecting the environment around the vehicle with information obtained from a device installed outside the vehicle.

The sensor evaluation system according to one aspect of the present disclosure is a system that evaluates a sensor which is provided in a vehicle and which is used for detecting an environment around the vehicle. The system includes an infrastructure device installed outside the vehicle and an information processing device.

The infrastructure device includes an infrastructure sensor that detects the environment around the infrastructure device, and an infrastructure information processing device that performs information processing. The infrastructure information processing device executes a first feature point detection process of detecting one or more feature points, each indicating a characteristic portion of the environment around the infrastructure device, based on detection information of the infrastructure sensor, and a first feature point position calculation process of calculating first feature point position information which is information on positions of the one or more feature points detected in the first feature point detection process.

The information processing device executes a second feature point detection process of detecting the one or more feature points in the environment around the vehicle based on the detection information of the sensor, a second feature point position calculation process of calculating second feature point position information which is information on positions of the one or more feature points detected in the second feature point detection process, a difference calculation process of calculating a difference between the first feature point position information and the second feature point position information associated with the same one or more feature points, and a function evaluation process of evaluating a function of the sensor based on a magnitude of the difference.

The first feature point position information may include information on a first detection time indicating a time when the infrastructure sensor detects the information on the position of the feature point associated with the first feature point position information. The second feature point position information may include information on a second detection time indicating a time when the sensor detects the information on the position of the feature point associated with the second feature point position information. The information processing device may calculate, in the difference calculation process, a difference between the first feature point position information and the second feature point position information in which the first detection time is equivalent to the second detection time.

The information processing device may determine that, in the function evaluation process, the function of the sensor is abnormal in a case where the difference is equal to or larger than a predetermined threshold. Furthermore, the vehicle may be a vehicle capable of receiving remote support by an operation of a remote support device located at a distance, and the information processing device may request the remote support from the remote support device upon being determined that the function of the sensor is abnormal.

The infrastructure information processing device may store first map information including a map and information on positions of several feature points on the map. In the first feature point position calculation process, the infrastructure information processing device may calculate a distance between a feature point of which position information is stored in the first map information and a feature point of which position information is not stored in the first map information, from among those feature points detected in the first feature point detection process, as the first feature point position information. Further, the infrastructure information processing device may store second map information including a map and information on positions of several feature points on the map. In the second feature point position calculation process, the information processing device may calculate a distance between a feature point of which position information is stored in the second map information and a feature point of which position information is not stored in the second map information, from among those feature points detected in the second feature point detection process, as the second feature point position information.

The sensor evaluation system may be further provided with a storage device that stores map information including a map and information on positions of several feature points on the map. The infrastructure information processing device may calculate, based on information on a position of a feature point on the map, of which position information is stored in the map information, a position of a feature point of which position information is not stored in the map information, from among those feature points detected in the first feature point detection process, as the first feature point position information. Furthermore, the infrastructure information processing device may calculate, based on information on a position of a feature point on the map, of which position information is stored in the map information, a position of a feature point of which position information is not stored in the map information, from among those feature points detected in the second feature point detection process, as the second feature point position information.

The sensor evaluation device according to one aspect of the present disclosure evaluates a sensor which is provided in a vehicle and which is used for detecting an environment around the vehicle. This sensor evaluation device includes a memory that stores a program, and a processor coupled to the memory. The processor executes, when executing the program, a process of acquiring detection information of the sensor, a process of acquiring, from an infrastructure device installed outside the vehicle, first feature point position information which is information on positions of one or more feature points, each indicating a characteristic portion of the environment around the vehicle, a feature point detection process of detecting the one or more feature points in the environment around the vehicle based on the detection information of the sensor, a second feature point position calculation process of calculating second feature point position information which is information on positions of the one or more feature points detected in the feature point detection process, a difference calculation process of calculating a difference between the first feature point position information and the second feature point position information associated with the same one or more feature points, and a function evaluation process of evaluating a function of the sensor based on a magnitude of the difference.

The vehicle according to one aspect of the present disclosure includes a sensor that detects an environment around the vehicle, and an information processing device. The information processing device executes a process of acquiring detection information from the sensor, a process of acquiring first feature point position information which is information on positions of one or more feature points, each indicating a characteristic portion of the environment around the vehicle, from an infrastructure device installed outside the vehicle, a feature point detection process of detecting the one or more feature points in the environment around the vehicle based on the detection information of the sensor, a second feature point position calculation process of calculating second feature point position information which is information on positions of the one or more feature points, a difference calculation process of calculating a difference between the first feature point position information and the second feature point position information associated with the same one or more feature points, and a function evaluation process of evaluating a function of the sensor based on a magnitude of the difference.

With the sensor evaluation system, the sensor evaluation device, and the vehicle of the present disclosure, the difference between the first feature point position information and the second feature point position information for the same feature point(s) detected from the environments around the vehicle and the infrastructure device is calculated. The function of the sensor is evaluated based on a magnitude of the difference. Consequently, the function of the sensor can be consecutively evaluated without observing the behavior of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to drawings. However, in a case where the specific numeral number related to elements, e.g., the number, quantity and range, is referred to in the embodiments shown below, the present disclosure is not limited to such a number unless the number is specifically clarified or clearly specified in principle. Additionally, structures and configurations described in the embodiments shown below are not essential to the present disclosure, unless they are specifically clarified or clearly specified in principle. The same or corresponding portions are assigned the same sign, and duplicated descriptions thereof will be appropriately simplified or omitted.

1. Overview

Figure 1:
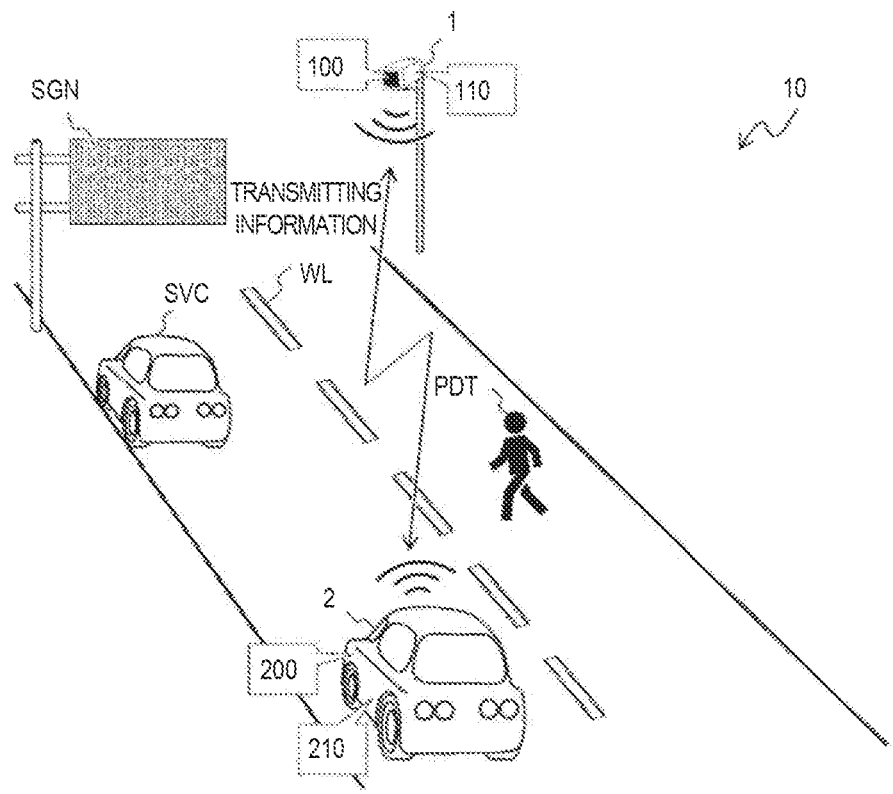
FIG. 1 is a conceptual diagram illustrating an overview of a sensor evaluation system according to the present embodiment.
Figure 1:
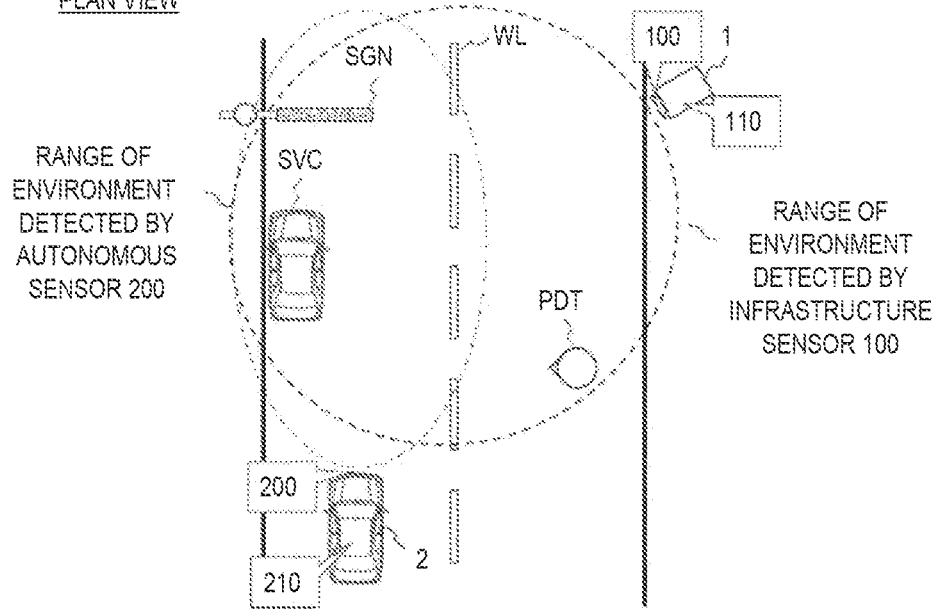

FIG. 1 is a conceptual diagram illustrating an overview of a sensor evaluation system 10 according to the present embodiment. FIG. 1 shows a case where a vehicle 2 travels on a road. The vehicle 2 may be an autonomous vehicle that travels by autonomous travel control. The vehicle 2 includes an autonomous sensor 200 which is a sensor that detects an environment around the vehicle 2 in order to acquire information related to control of the vehicle 2. The autonomous sensor 200 may be, for example, a radar, a camera, or a Light Detection and Ranging (LIDAR). Alternatively, it may be configured by a plurality of sensors and a processing device that performs sensor fusion. The environment around the vehicle 2 detected by the autonomous sensor 200 may be, for example, a signboard SGN, a stopped vehicle SVC, a pedestrian PDT, and a white line WL. However, the environment is not limited to targets, and may be walls, road surfaces, shapes, colors, and brightness values.

The sensor evaluation system 10 evaluates the autonomous sensor 200. The sensor evaluation system 10 includes an infrastructure device 1 installed outside the vehicle 2, and an information processing device 210 that executes a process related to the evaluation of the autonomous sensor 200. The information processing device 210 is configured to be capable of transmitting information to the autonomous sensor 200 and the infrastructure device 1. In FIG. 1, the information processing device 210 is provided in the vehicle 2. In this case, for example, the vehicle 2 and the infrastructure device 1 may be provided with a communication device, and wireless communication may be established between the vehicle 2 and the infrastructure device 1 so as to transmit information. The information processing device 210 electrically or wirelessly connects to the autonomous sensor 200 and the communication device, and transmits information to the autonomous sensor 200 and the infrastructure device 1. The information processing device 210 provided in the vehicle 2 is typically an electronic control unit (ECU) including a memory and a processor.

However, the information processing device 210 may be provided outside the vehicle 2. For example, it may be a server configured on a network to which the vehicle 2 and the infrastructure device 1 are connected. In this case, the information processing device 210 transmits information to the vehicle 2 and the infrastructure device 1 via the network.

The infrastructure device 1 includes an infrastructure sensor 100 that detects the environment around the infrastructure device 1, and an infrastructure information processing device 110 that performs information processing. The infrastructure device 1 is installed such that a range of the environment detected by the infrastructure sensor 100 may overlap with a range of the environment detected by the autonomous sensor 200. For example, it may be installed along the road on which the vehicle 2 travels as shown in FIG. 1.

The environment around the infrastructure device 1 detected by the infrastructure sensor 100 is the same as that of the autonomous sensor 200. However, the range of the environment detected by the infrastructure sensor 100 may be different from the range of the environment detected by the autonomous sensor 200. For example, as shown in the plan view of FIG. 1, the range of the environment (dashed line) detected by the autonomous sensor 200 may include the signboard SGN and the stopped vehicle SVC, but not the pedestrian PDT. On the other hand, the range of the environment (broken line) detected by the infrastructure sensor 100 includes all the signboard SGN, the stopped vehicle SVC, and the pedestrian PDT. As described above, the ranges of the environment detected by the infrastructure sensor 100 and the autonomous sensor 200 need only overlap, and do not have to be the same.

The infrastructure information processing device 110 acquires the detection information from the infrastructure sensor 100, and calculates first feature point position information indicating information on positions of feature point (s) in the environment around the infrastructure device 1, based on the detection information. The feature point is a point indicating a characteristic portion, for example, a point corresponding to a corner of the signboard SGN, and a point corresponding to a gap between the white lines WL. It may be a boundary between colors or luminance values.

The information processing device 210 acquires the detection information from the autonomous sensor 200, and calculates second feature point position information indicating information on positions of feature point(s) in the environment around the vehicle 2, based on the detection information. The first feature point position information is acquired from the infrastructure device 1, and the function of the autonomous sensor 200 is evaluated based on a magnitude of a difference between the first feature point position information and the second feature point position information, which are both related to the same feature point(s). For example, in a case where any one of the calculated differences is equal to or larger than a predetermined threshold, it is determined that the function of the autonomous sensor 200 is abnormal. This is because, in a case where the difference is equal to or larger than the predetermined threshold, it is considered that the detection information of the infrastructure sensor 100 is different from the detection information of the autonomous sensor 200. Alternatively, a stepwise evaluation may be carried out according to the magnitude of the calculated difference.

Figure 2:
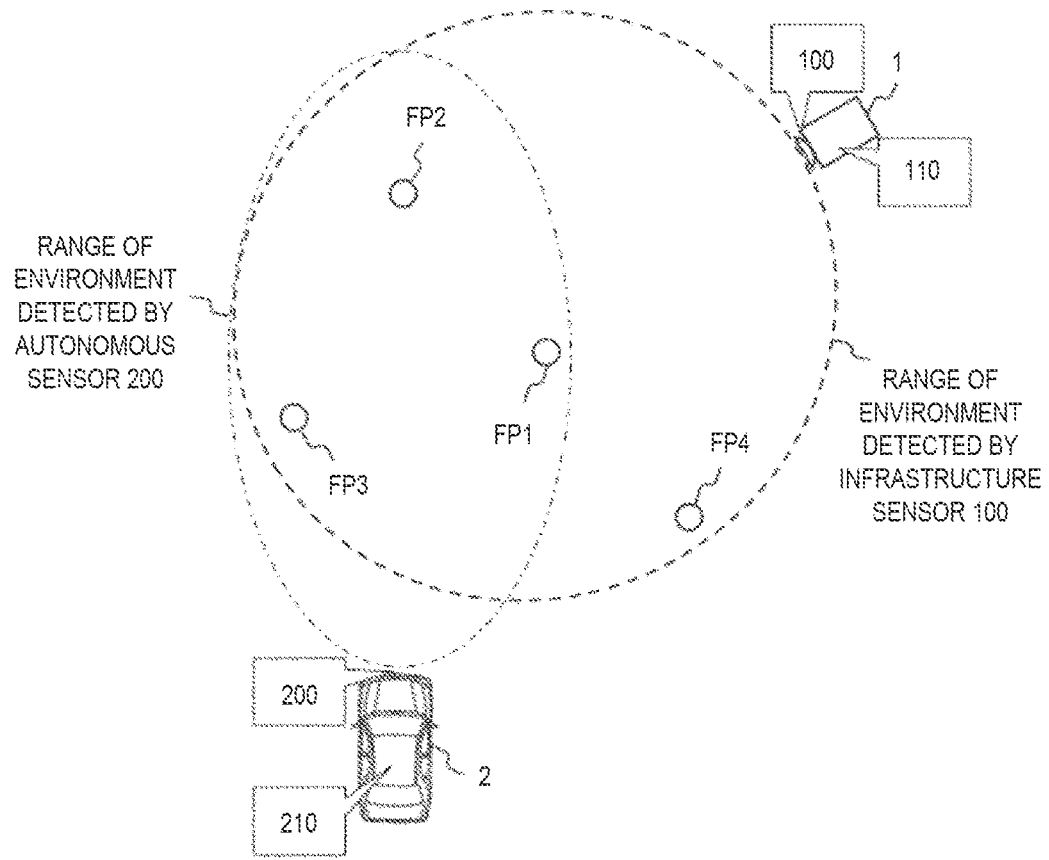
FIG. 2 is a conceptual diagram illustrating an overview of sensor evaluation using a sensor evaluation system according to the present embodiment.

FIG. 2 is a conceptual diagram illustrating an overview of evaluation for the autonomous sensor 200 using the sensor evaluation system 10. In FIG. 2, FP indicates a feature point. A number is added to a sign to distinguish each of the feature points.

In FIG. 2, the infrastructure information processing device 110 detects four feature points, FP1, FP2, FP3, and FP4, from the environment detected by the infrastructure sensor 100. Therefore, the infrastructure information processing device 110 detects the first feature point position information related to the feature points FP1, FP2, FP3, and FP4. It may be, for example, the information on a distance between the feature point FP1 and the feature points FP2, FP3, and FP4.

In FIG. 2, the information processing device 210 detects three feature points, FP1, FP2, and FP3, from the environment detected by the autonomous sensor 200. Therefore, the information processing device 210 detects the second feature point position information related to the feature points FP1, FP2, and FP3. It may be, for example, the information on a distance between the feature point FP1 and the feature points FP2 and FP3.

The information processing device 210 acquires the first feature point position information calculated by the infrastructure information processing device 110. The difference between the first feature point position information and the second feature point position information is calculated. Those two pieces of information are related to the feature points, FP1, FP2, and FP3 detected by both the information processing device 210 and the infrastructure information processing device 110. On the other hand, since the information processing device 210 has not detected the feature point FP4, the first feature point position information related to the feature point FP4 is not considered.

The information processing device 210 evaluates the function of the autonomous sensor 200 based on the magnitude of the difference calculated as stated above.

2. First Embodiment 2-1. Configuration

Figure 3:
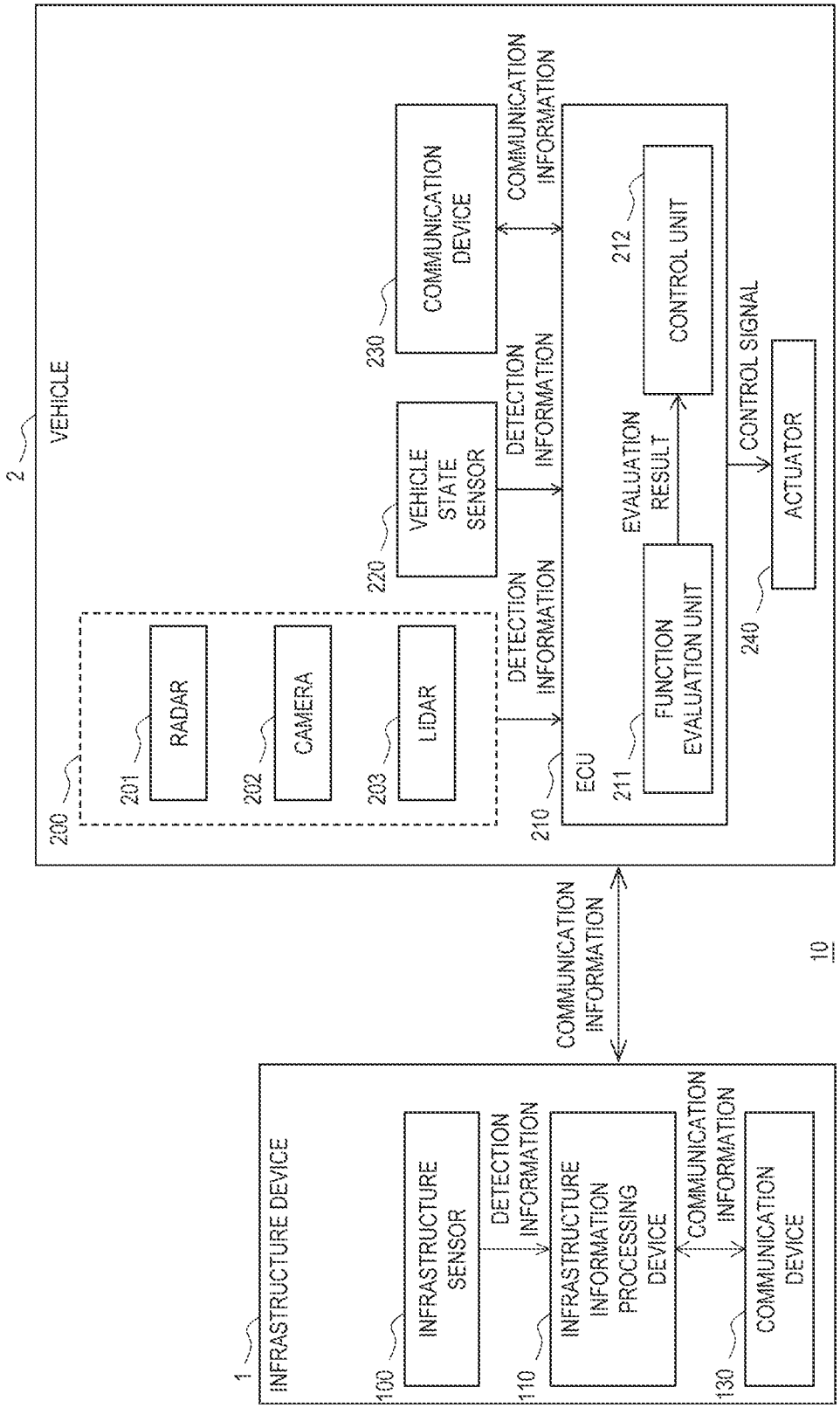
FIG. 3 is a block diagram illustrating a configuration example of the sensor evaluation system according to a first embodiment.

FIG. 3 is a block diagram illustrating a configuration of the sensor evaluation system 10 according to a first embodiment. The sensor evaluation system 10 evaluates the autonomous sensor 200 which is a sensor provided in the vehicle 2 and used for detecting the environment around the vehicle 2.

The sensor evaluation system 10 includes the infrastructure device 1. The infrastructure device 1 includes the infrastructure sensor 100 that detects the environment around the infrastructure device 1, the infrastructure information processing device 110 that performs information processing, and a communication device 130.

The infrastructure sensor 100 detects information on the environment around the infrastructure device 1 and outputs the detection information. The detection information includes at least information indicating a positional relationship between the infrastructure device 1 and the environment around the infrastructure device 1. The infrastructure sensor 100 may be in any form as long as it can detect the information indicating the positional relationship between the infrastructure device 1 and the environment around the infrastructure device 1. For example, it may be a pressure sensor that detects a pressure on the ground around the infrastructure device 1 and detects information indicating the positional relationship based on the detected pressure. Similar to the autonomous sensor 200, it may be configured by a radar, a camera, a LIDAR, or the like.

The infrastructure information processing device 110 is typically an electronic computer including a memory and a processor. The memory includes a random-access memory (RAM) for temporarily storing data and a read only memory (ROM) for storing control programs that can be executed by the processor, and various data related to the control programs. The processor reads a program from the memory and executes a process according to the program based on various types of data read from the memory. The infrastructure information processing device 110 executes the process according to the program based on the detection information acquired from the infrastructure sensor 100, and outputs the execution result. The process executed by the infrastructure information processing device 110 includes a process of calculating the first feature point position information, which will be described later. That is, the execution result includes the first feature point position information. Details of the process executed by the infrastructure information processing device 110 will be described later.

The memory of the infrastructure information processing device 110 stores first map information, which is map information, as the data related to the process executed by the processor. The first map information may be two-dimensional map information or three-dimensional map information. Further, the first map information includes information on the positions of several feature point FPs on a map related to the first map information.

The communication device 130 is a device that communicates with the vehicle 2 and transmits/receives various pieces of information (communication information). The communication information transmitted by the communication device 130 includes at least information on the output result of the infrastructure information processing device 110. That is, the first feature point position information is included. The communication established by the communication device 130 may be in any form. For example, it may be established by transmitting and receiving radio waves, or the communication device 130 may be connected to a network and may transmit/receive the communication information via the network.

The vehicle 2 includes the autonomous sensor 200 that detects the environment around the vehicle 2, the ECU 210 (information processing device), a vehicle state sensor 220 that detects a state of the vehicle 2, a communication device 230, and an actuator 240. The vehicle 2 is controlled in various ways by the ECU 210. The "various ways" may include, for example, autonomous travel control and collision mitigation braking. The ECU 210 executes various processes related to the control of the vehicle 2 based on the information acquired from the autonomous sensor 200, the vehicle state sensor 220, and the communication device 230, and generates a control signal. By operating the actuator 240 according to the control signal, various controls of the vehicle 2 are implemented.

The autonomous sensor 200 includes a radar 201, a camera 202, and a LIDAR 203. Other sensors that detect the environment around the vehicle 2 may be included. Further, a processing device that performs sensor fusion on the detection information of these sensors may be included. The autonomous sensor 200 detects information on the environment around the vehicle 2 and outputs the detection information. For example, the radar 201 may output information on distance, angle, and speed of the target in a distance of radio wave irradiation with respect to the vehicle 2. The camera 202 outputs information on image data obtained by capturing the environment around the vehicle 2 and information detected by analyzing the image data. The LIDAR 203 outputs information on point cloud data of the environment around the vehicle 2.

These pieces of detection information include at least information indicating a positional relationship between the vehicle 2 and the environment around the vehicle 2. For example, the detection information of the camera 202 may be the information indicating the positional relationship between the vehicle 2 and the environment around the vehicle 2, corresponding to specific points on the image, by analyzing the image data. The detection information of the LIDAR 203 is information indicating the positional relationship between the vehicle 2 and each point on the point cloud data. Alternatively, the information indicating the positional relationship between the vehicle 2 and the environment around the vehicle 2 may be given by performing sensor fusion on the detection information of the radar 201, the camera 202, and the LIDAR 203.

The vehicle state sensor 220 detects information on the state of the vehicle 2 and outputs the detection information. The vehicle state sensor 220 may be, for example, a wheel speed sensor, a G sensor, or a gyro sensor. The wheel speed sensor is a sensor that detects vehicle speed of the vehicle 2. The G sensor is a sensor that detects acceleration of the vehicle 2. The gyro sensor detects angular velocity or angular acceleration of the vehicle 2 in the yaw direction, roll direction, and pitch direction.

The communication device 230 is a device that communicates with the device outside the vehicle 2 and transmits/receives various information (communication information). The communication device 230 may be, for example, a device for establishing vehicle-to-vehicle communication or road-to-vehicle communication, or a device that provides a global positioning system (GPS) function. The communication device 230 is configured to communicate with the infrastructure device 1 via at least the communication device 130. Further, the communication information received from the infrastructure device 1 by the communication device 230 via the communication device 130 and output by the communication device 230 to the device provided in the vehicle 2 includes at least the first feature point position information. Moreover, the communication established by the communication device 230 may be in any form.

The ECU 210 includes a function evaluation unit 211 and a control unit 212. The function evaluation unit 211 executes a process of evaluating the function of the autonomous sensor 200. The function evaluation unit 211 transmits the evaluation result for the function of the autonomous sensor 200 to the control unit 212. Details of the process executed by the function evaluation unit 211 will be described later.

The control unit 212 executes various processes related to the control of the vehicle 2 and generates a control signal. Further, the control unit 212 executes a process according to the evaluation result transmitted from the function evaluation unit 211. For example, in a case where the evaluation result indicates that the function of the autonomous sensor 200 is abnormal, the operation of the control function based on the detection information of the autonomous sensor 200 may be ceased. Alternatively, in a case where the evaluation result indicates that the function of the autonomous sensor 200 is declined, the operator of the vehicle 2 is notified of the decline in performance of the control function based on the detection information of the autonomous sensor 200, or a state of the control function due to the functional deterioration of the autonomous sensor 200 is evaluated. The control function based on the detection information of the autonomous sensor 200 may include, for example, self-position estimation function and autonomous travel control.

The memory of the ECU 210 stores second map information, which is map information, as the data related to the processes executed by the function evaluation unit 211 and the control unit 212. The second map information may be two-dimensional map information or three-dimensional map information. Further, the second map information may be information given in advance or information created by the control unit 212 by mapping. Moreover, the second map information includes information on the positions of several feature point FPs on a map related to the second map information. The information on the position of the feature point FP on the map may be information given in advance or information given by the control unit 212 by mapping.

The second map information stored in the memory of the ECU 210 and the first map information stored in the memory of the infrastructure information processing device 110 do not have to be common map information. Further, the feature point FP of which the position information is included in the second map information may be different from the feature point FP of which the position information is included in the first map information.

The function evaluation unit 211 and the control unit 212 may be respectively implemented as processing components of the control program, or alternatively as separate processors. Moreover, the function evaluation unit 211 and the control unit 212 may be configured by separate ECUs. Further, the control unit 212 may be configured by separate ECUs for each of controls or for each of control groups. In this case, the ECU 210 is configured by a plurality of ECUs. At this time, the respective ECUs are connected to transmit information to each other, such that information required for executing the process can be acquired. At least, the ECUs related to the function evaluation unit 211 are connected to transmit information to the respective ECUs constituting the control unit 212.

The actuator 240 is operated according to the control signal provided by the ECU 210. The actuator 240 is configured by various actuators according to required functions. For example, the ECU 210 executes a process related to autonomous travel control, and control signals related to acceleration, deceleration, and steering are transmitted to the actuator 240. By operating the actuator 240 according to the control signals, the vehicle autonomously travels.

2-2. Processing 2-2-1. Infrastructure Information Processing Device

Figure 4:
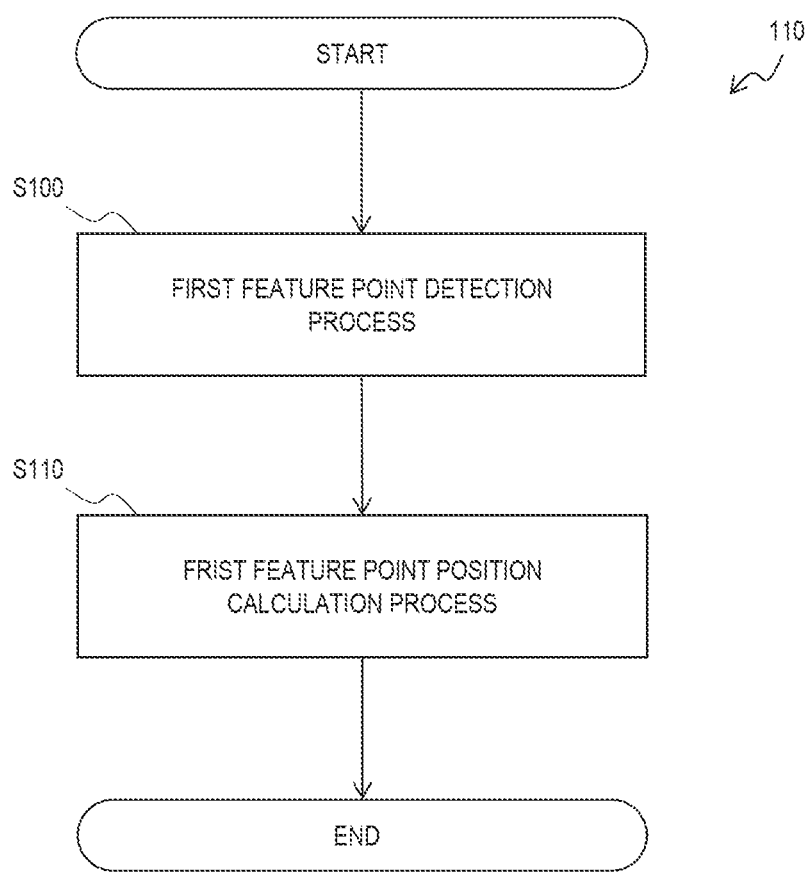
FIG. 4 is a flowchart illustrating a process executed by an infrastructure information processing device according to the present embodiment.

FIG. 4 is a flowchart illustrating a process executed by the infrastructure information processing device 110. The process shown in FIG. 4 may be repeatedly executed at predetermined intervals, or the execution of the process may be triggered under specific conditions. For example, the execution of the process may be started on the condition that the vehicle 2 enters a specific range around the infrastructure device 1. In this case, whether the process is started can be determined based on, for example, the detection information of the infrastructure sensor 100 and the communication information between the vehicle 2 and the infrastructure device 1.

In step S100 (first feature point detection process), the infrastructure information processing device 110 detects one or more feature points FP in the environment around the infrastructure device 1 from the detection information of the infrastructure sensor 100. The detected feature points FP include a feature point FP (hereinafter also referred to as a "first registered feature point") of which the position information is included in the first map information, and a feature point FP (hereinafter also referred t to as a "first unregistered feature point") of which the position information is not included in the first map information.

A method of detecting the feature point FP may differ depending on the form of the infrastructure sensor 100 and details of the detection information. For example, in a case where the detection information is given as the image data, the feature point FP may be detected by image analysis. In a case where the detection information is given as the point cloud data, the feature point FP is detected by shape recognition. Alternatively, these detections may be performed by the infrastructure sensor 100, and the feature point FP may be given as the detection information.

Further, it is desirable that the position of the feature point FP detected on the map hardly changes over time. For example, a feature point FP related to a fixed target (signboard, pillar, etc.) or a stationary target (stopped vehicle, etc.) may be desirable. This is to reduce errors due to a change in position over time in a difference calculation process described later.

After step S100 ends, the process proceeds to step S110.

Figure 5:
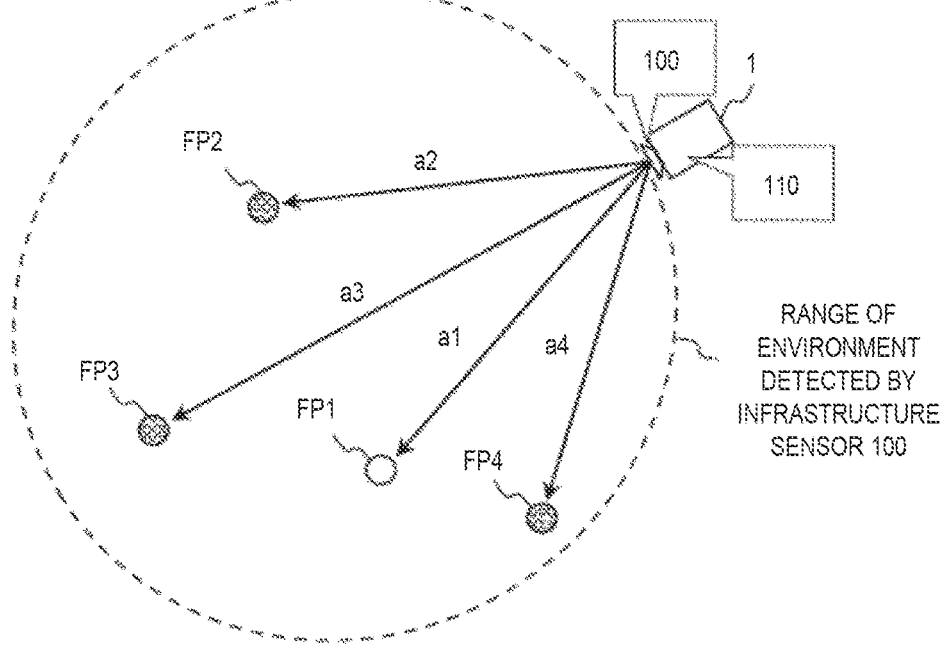
FIG. 5 is a conceptual diagram illustrating a first feature point position calculation process executed by an infrastructure information processing device according to the first embodiment.

In step S110 (first feature point position calculation process), the infrastructure information processing device 110 calculates information (first feature point position information) on the positions of the feature point(s) FP detected in step S100. FIG. 5 is a conceptual diagram illustrating the first feature point position calculation process. FIG. 5 shows a case where the infrastructure information processing device 110 detects four feature points, FP1, FP2, FP3, and FP4 in step S100. The feature point FP1 is the first unregistered feature point, and the feature points FP2, FP3, and FP4 are the first registered feature points. In step S110, the infrastructure information processing device 110 calculates a distance between the feature point FP1 that is the first unregistered feature point, and the feature points FP2, FP3 and FP4 that are the first registered feature points, as the first feature point position information.

Details thereof will be described hereinbelow. The infrastructure information processing device 110 gives position vectors a1, a2, a3, and a4 with the position of the infrastructure device 1 as a base point to each of the detected feature points FP1, FP2, FP3, and FP4, based on the detection information of the infrastructure sensor 100. The differences between the position vectors, a2−a1, a3−a1, and a4−a1, are used as the first feature point position information.

2-2-2. Function Evaluation Unit

Figure 6:
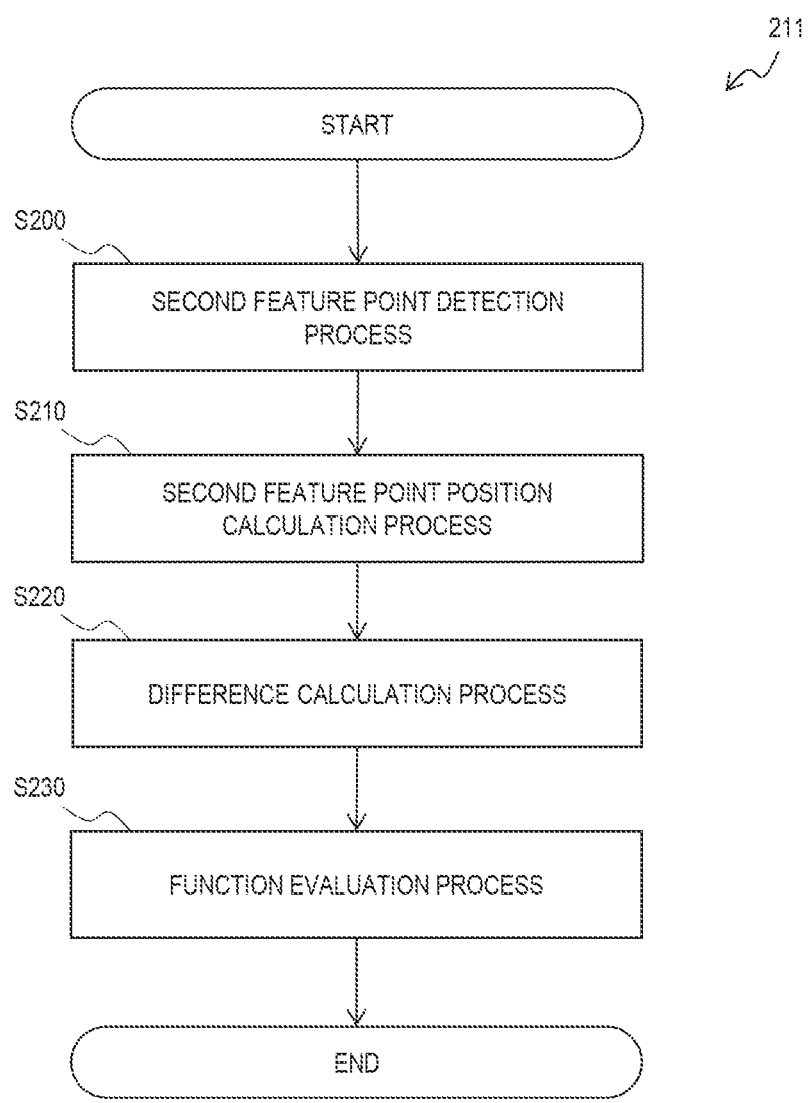
FIG. 6 is a flowchart illustrating a process executed by a function evaluation unit according to the present embodiment.

FIG. 6 is a flowchart illustrating a process executed by the function evaluation unit 211. The process shown in FIG. 6 may be repeatedly executed at predetermined intervals, or may be triggered under specific conditions.

In step S200 (second feature point detection process), the function evaluation unit 211 detects one or more feature points FP in the environment around the vehicle 2 from the detection information of the autonomous sensor 200. The detected feature points FP includes a feature point FP (hereinafter also referred to as a "second registered feature point") of which the position information is included in the second map information, and a feature point FP (hereinafter also referred to as a "second unregistered feature point") of which the position information is not included in the second map information.

A method of detecting the feature point FP may differ depending on the form of the autonomous sensor 200 and details of the detection information. Alternatively, the feature point FP may be detected by the autonomous sensor 200, and the feature point FP may be given as the detection information.

After step S200 ends, the process proceeds to step S210.

Figure 7:
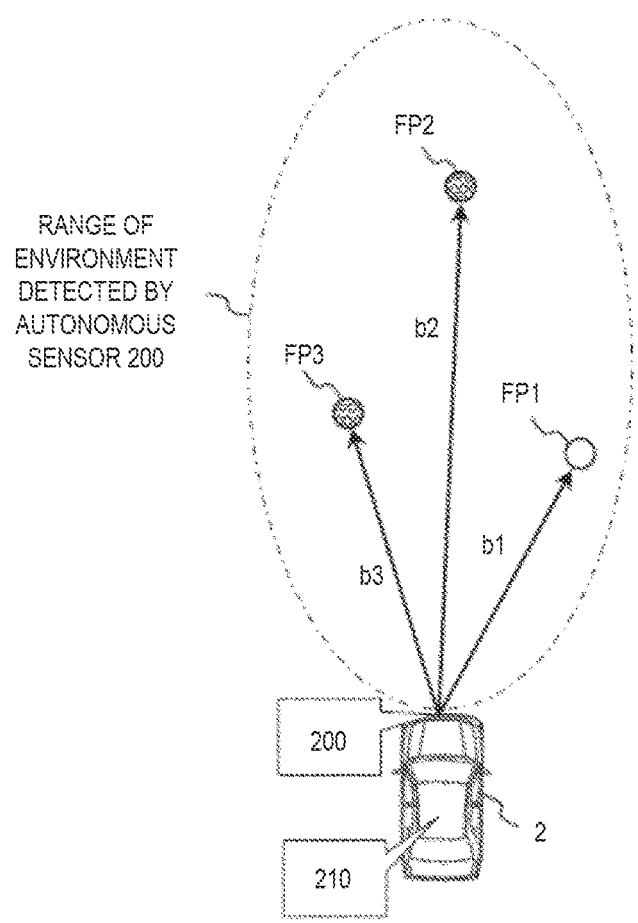
FIG. 7 is a conceptual diagram illustrating a second feature point position calculation process executed by a function evaluation unit according to the first embodiment.

In step S210 (second feature point position calculation process), the function evaluation unit 211 calculates information (second feature point position information) on the positions of the feature point(s) FP detected in step S200. FIG. 7 is a conceptual diagram illustrating the second feature point position calculation process. FIG. 7 shows a case where the function evaluation unit 211 detects three feature points, FP1, FP2, and FP3 in step S200. The feature point FP1 is the second unregistered feature point, and the feature points FP2 and FP3 are the second registered feature points. In step S210, the function evaluation unit 211 calculates a distance between the feature point FP1 that is the second unregistered feature point, and the feature points FP2 and FP3 that are the second registered feature points, as the second feature point position information.

Details thereof will be described hereinbelow. The function evaluation unit 211 gives position vectors b1, b2, and b3 with the position of the vehicle 2 as a base point to each of the detected feature points FP1, FP2, and FP3, based on the detection information of the autonomous sensor 200. The differences between the position vectors, b2−b1 and b3−b1, are used as the second feature point position information.

After step S210 ends, the process proceeds to step S220.

In step S220 (difference calculation process), the function evaluation unit 211 calculates the difference between the first feature point position information and the second feature point position information, which are related to the same feature point(s) FP.

Details thereof will be described hereinbelow. It is assumed that the function evaluation unit 211 acquires the first feature point position information described in FIG. 5 from the infrastructure device 1 and calculates the second feature point position information described in FIG. 7. It is assumed that the feature points FP1, FP2, and FP3 shown in FIGS. 5 and 7 are the same. Therefore, the function evaluation unit 211 calculates the difference between the first feature point position information and the second feature point position information, which are related to the feature points FP1, FP2, and FP3. That is, the difference Δ2 between a2−a1 and b2−b1 and the difference Δ3 between a3−a1 and b3−b1 are calculated. They are calculated using the following equations (1) and (2). In the following equations, $\|v\|$ represents the Euclidean norm of the vector v.

[Eq. 1]

$$\Delta 2 = \|(a2-a1)-(b2-b1)\| \quad (1)$$

[Eq. 2]

$$\Delta 3 = \|(a3-a1)-(b3-b1)\| \quad (2)$$

Since the feature point FP detected by the function evaluation unit 211 does not include the same feature point FP as the feature point FP4 detected by the infrastructure information processing device 110, a4−a1 of the first feature point position information is not considered in the difference calculation process.

The description returns to FIG. 6. After step S220 ends, the process proceeds to step S230.

In step S230 (function evaluation process), the function evaluation unit 211 evaluates the function of the autonomous sensor 200 based on the magnitude of the difference calculated in step S220. In a case where the difference calculated in step S220 is equal to or larger than a predetermined threshold k1, the function evaluation unit 211 determines that the function of the autonomous sensor 200 is abnormal. The threshold k1 is a value given to the program in advance, and is determined by a conformity experiment of the sensor evaluation system 10.

Details thereof will be described hereinbelow. In step S220, it is assumed that the function evaluation unit 211 calculates the differences 42 and 43 represented by the equations (1) and (2). The function evaluation unit 211 compares each of the differences 42 and 43 with the threshold k1. In a case where any one of the differences 42 and 43 is equal to or larger than the threshold k1, it is determined that the function of the autonomous sensor 200 is abnormal. Alternatively, in a case where the sum of squares of the differences 42 and 43 are calculated and the sum of squares is equal to or larger than the threshold k1, the function of the autonomous sensor 200 may be determined as abnormal.

By the process stated above, the function of the autonomous sensor 200 can be consecutively evaluated without observing the behavior of the vehicle 2. Furthermore, by acquiring the evaluation result of the function of the autonomous sensor 200, the control unit 212 can evaluate availability and performance of the control function based on the detection information of the autonomous sensor 200.

2-3. Modified Examples

The sensor evaluation system 10 according to the first embodiment may adopt a modified aspect as follows.

2-3-1. Modified Example 1

The first feature point position information may include information on a time when the infrastructure sensor 100 detects the information on the position of the feature point related to the first feature point position information (hereinafter, also referred to as "first detection time"). The second feature point position information may include information on a time when the autonomous sensor 200 detects the information on the position of the feature point related to the second feature point position information (hereinafter, also referred to as "second detection time"). The function evaluation unit 211 may calculate a difference between the first feature point position information and the second feature point position information in the difference calculation process, in which the first detection time is equivalent to the second detection time.

Consequently, the feature point FP of which the position changes over time (for example, the feature point FP related to the pedestrian) can be detected. Further, the function evaluation unit 211 can evaluate the function of the autonomous sensor 200 based on the difference data calculated seamlessly in the function evaluation process. For example, the difference can be calculated for data of 10 seconds for the first feature point position information and the second feature point position information, which are related to the specific feature point FP, and the function related to tracking of the autonomous sensor 200, based on the magnitude of the difference can be evaluated.

2-3-2. Modified Example 2

The vehicle 2 may be a vehicle capable of receiving remote support by an operation of a remote support device located at a distance, and the ECU 210 may make a request to the remote support device for the remote support in a case where the function evaluation unit 211 determines, in the function evaluation process, that the function of the autonomous sensor 200 is abnormal.

Figure 8:
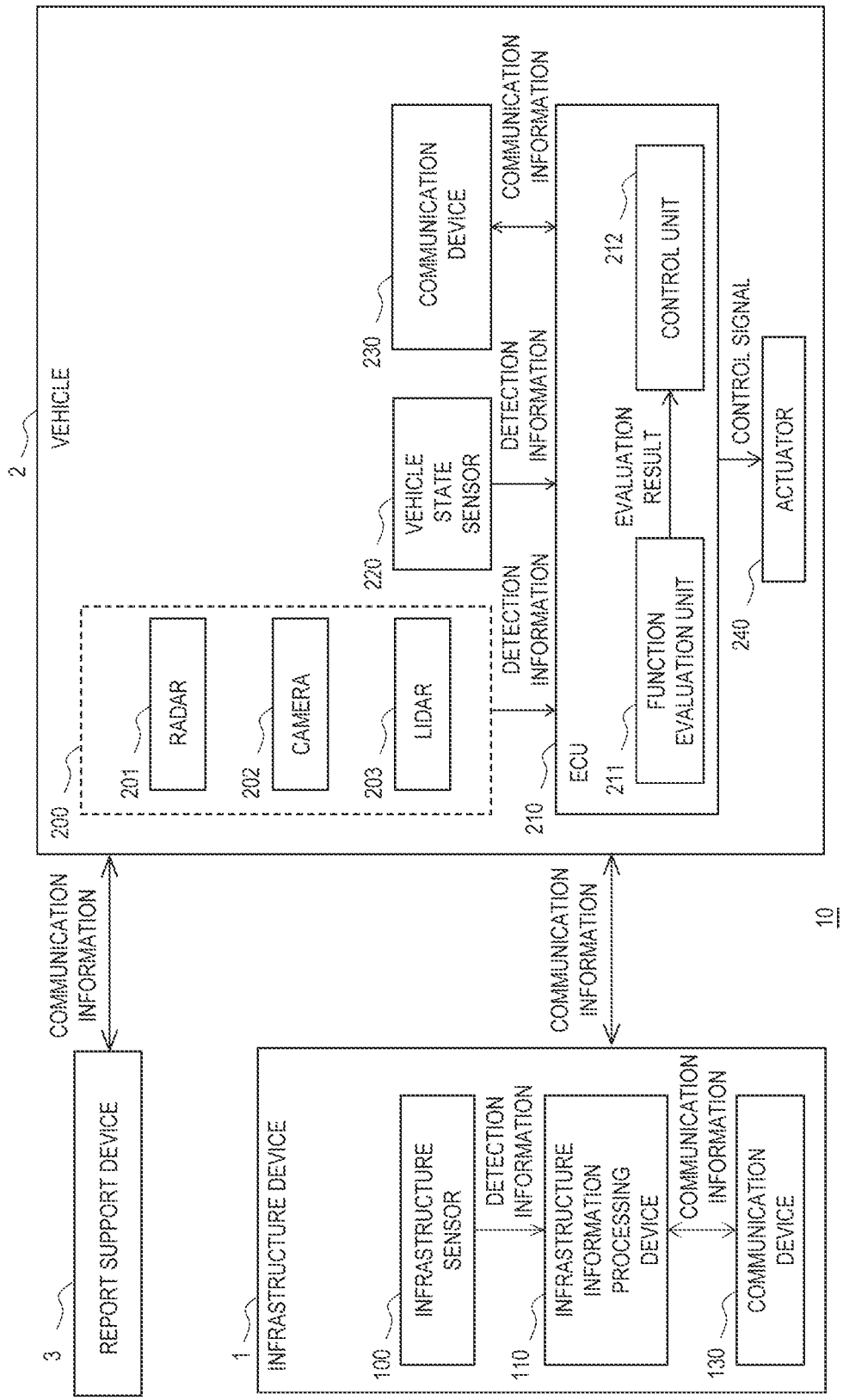
FIG. 8 is a block diagram illustrating a configuration example of a sensor evaluation system according to Modified Example 2 of the first embodiment.

FIG. 8 is a block diagram illustrating a configuration of the sensor evaluation system 10 according to Modified Example 2. In the configuration shown in FIG. 8, a remote support device 3 is provided, in contrast with the configuration shown in FIG. 3. The remote support device 3 is configured to communicate with the vehicle 2 and to transmit/receive various pieces of information (communication information). The remote support device 3 performs remote support for the vehicle 2 by transmitting and receiving the communication information. The remote support performed by the remote support device 3 may be, for example, remote control of the vehicle 2. In this case, the communication information transmitted by the remote support device 3 to the vehicle 2 includes driving operation information for remote driving. The communication information received from the vehicle 2 by the remote support device 3 includes a traveling image of the vehicle 2.

In a case where the function evaluation unit 211 determines that the function of the autonomous sensor 200 is abnormal in the function evaluation process, the ECU 210 outputs a signal indicating a request for remote support to the communication device 230. The remote support device 3 receives the request for remote support from the vehicle 2 via the communication device 230, and performs the remote support for the vehicle 2. For example, the remote support device 3 may start the remote control of the vehicle 2.

Consequently, the remote support for the vehicle 2 can be performed at an appropriate timing without constantly monitoring the state of the vehicle 2. For example, in a case where the autonomous travel control is not sufficiently executed due to the fact that the function of the autonomous sensor 200 is declined while the vehicle 2 is executing the autonomous travel control, it is possible to detect the functional deterioration of the autonomous sensor 200 and then send the request for the remote support.

3. Second Embodiment

A second embodiment will be described hereinbelow. However, matters already explained will be omitted as appropriate.

3-1. Configuration

Figure 9:
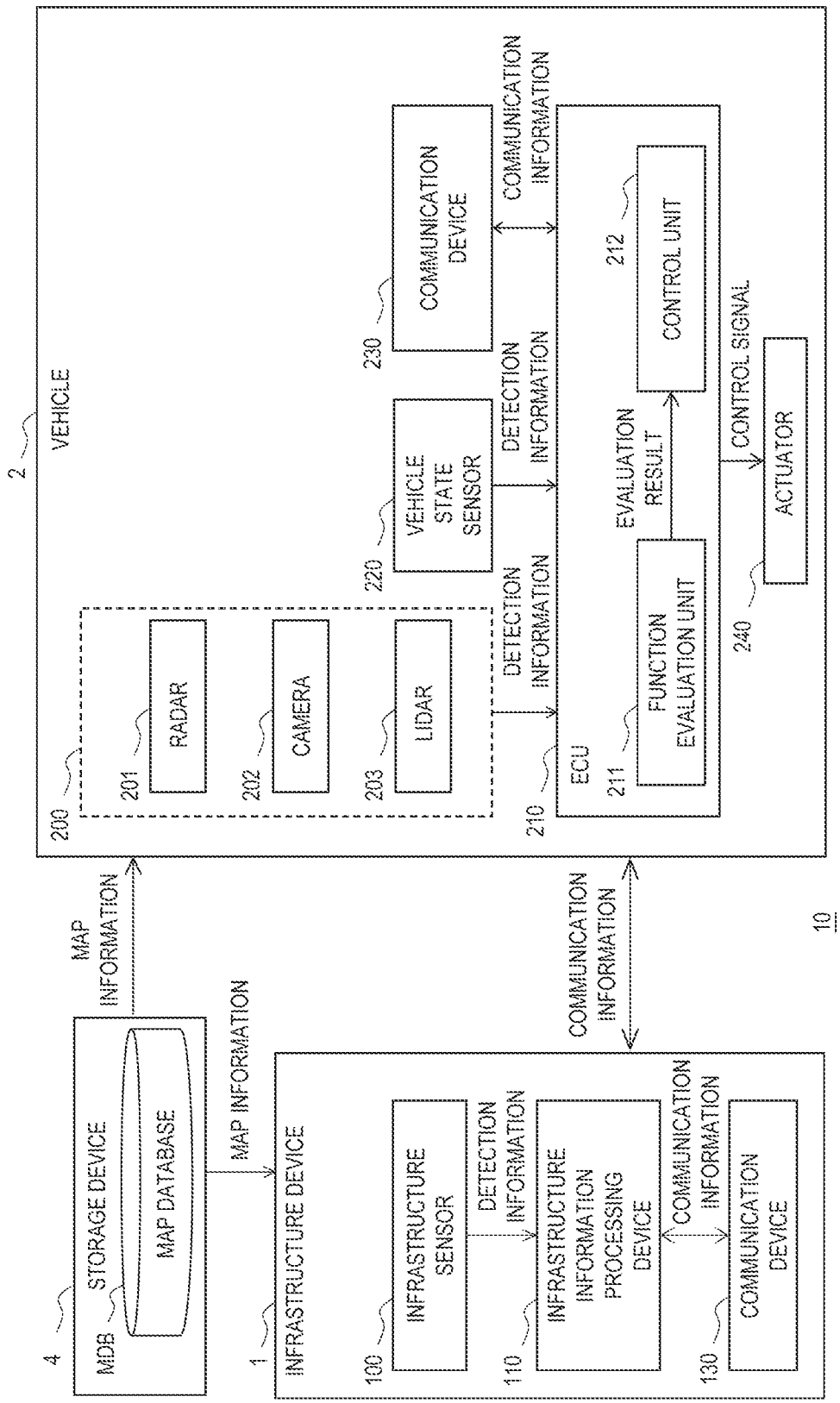
FIG. 9 is a block diagram illustrating a configuration example of a sensor evaluation system according to a second embodiment.

FIG. 9 is a block diagram illustrating a configuration example of the sensor evaluation system 10 according to a second embodiment. In the configuration shown in FIG. 9, a storage device 4 is provided, in contrast with the configuration shown in FIG. 3. The storage device 4 stores a map database MDB, which is a database related to the map information. Moreover, the map database MDB includes information on the positions of several feature point FPs on the map.

The storage device 4 is configured to communicate with the vehicle 2 and the infrastructure device 1. The storage device 4 is typically a memory of a server configured on the network. The vehicle 2 and the infrastructure device 1 acquire the map information from the storage device 4 via the network. The function evaluation unit 211 and the infrastructure information processing device 110 execute processes based on the map information acquired from the storage device 4. Therefore, in the sensor evaluation system 10 according to the second embodiment, the memories of the ECU 210 and the infrastructure information processing device 110 do not have to independently store the map information.

3-2. Processing

In the sensor evaluation system 10 according to the second embodiment, the first feature point position information and the second feature point position information are different as compared with the sensor evaluation system 10 according to the first embodiment. Hereinafter, the process executed by the infrastructure information processing device 110 and the function evaluation unit 211 according to the second embodiment will be described focusing on details different from the sensor evaluation system 10 according to the first embodiment.

3-2-1. Infrastructure Information Processing Device

A flowchart illustrating a process executed by the infrastructure information processing device 110 according to the second embodiment is the same as that in FIG. 4. However, details of the process executed in step S110 (first feature point position calculation process) are different from details described in the first embodiment. Further, in step S100 (first feature point detection process), the feature points FP detected by the infrastructure information processing device 110 include a feature point FP of which a position on the map is stored in the map database MDB (hereinafter also referred to as "registered feature point"), and a feature point FP (hereinafter also referred to as "unregistered feature point") of which a position on the map is not stored in the map database.

Figure 10:
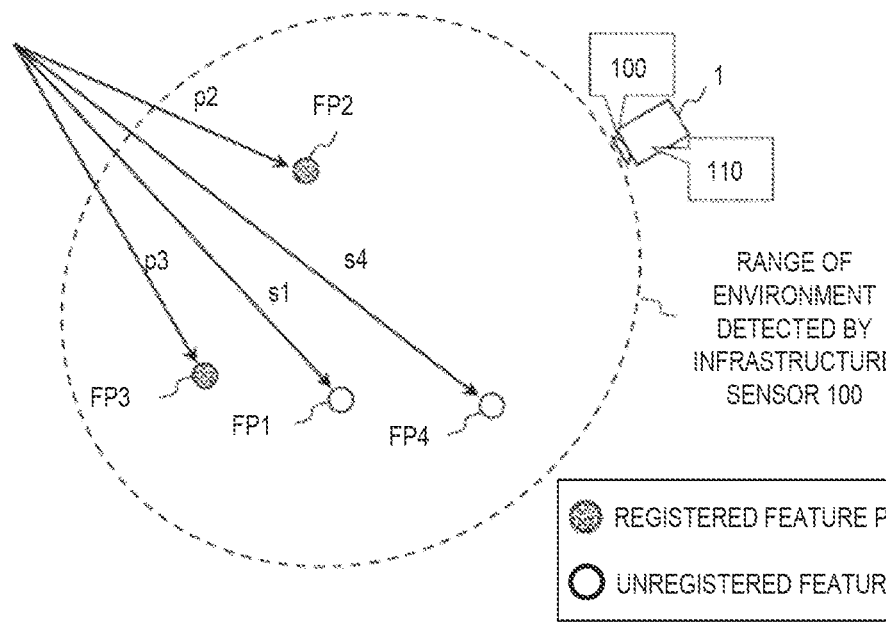
FIG. 10 is a conceptual diagram illustrating a first feature point position calculation process executed by an infrastructure information processing device according to the second embodiment.

FIG. 10 is a conceptual diagram illustrating a first feature point position calculation process executed by the infrastructure information processing device 110 according to the second embodiment. FIG. 10 shows a case where the infrastructure information processing device 110 detects four feature points, FP1, FP2, FP3, and FP4 in the first feature point detection process. The feature points FP1 and FP4 are the unregistered feature point, and the feature points FP2 and FP3 are the registered feature points. In the first feature point position calculation process, the infrastructure information processing device 110 calculates the positions of the feature points FP1 and FP4 on the map, which are the unregistered feature points, as the first feature point position information.

Details thereof will be described hereinbelow. The infrastructure information processing device 110 gives position vectors p2 and p3 of the feature points FP2 and FP3, which are the registered feature points, from the map information acquired from the storage device 4. The position of the infrastructure device 1 on the map is estimated based on the position vectors p2 and p3, and the detection information of the infrastructure sensor 100 related to the feature points FP2 and FP3. Alternatively, the position of the infrastructure device 1 on the map may be given to the program in advance. Position vectors s1 and s4 of the feature points FP1 and FP4, which are the unregistered feature points, are calculated, as the first feature point position information, based on the position of the infrastructure device 1 on the map, and the detection information of the infrastructure sensor 100 related to the feature points FP1 and FP4.

3-2-2. Function Evaluation Unit

A flowchart illustrating a process executed by the function evaluation unit 211 according to the second embodiment is the same as that in FIG. 6. However, details of the processes executed in step S210 (second feature point position calculation process) and executed in step S220 (difference calculation process) are different from details described in the first embodiment. Further, the feature point FP detected by the function evaluation unit 211 in step S200 (second feature point detection process) includes the registered feature points and the unregistered feature points.

Figure 11:
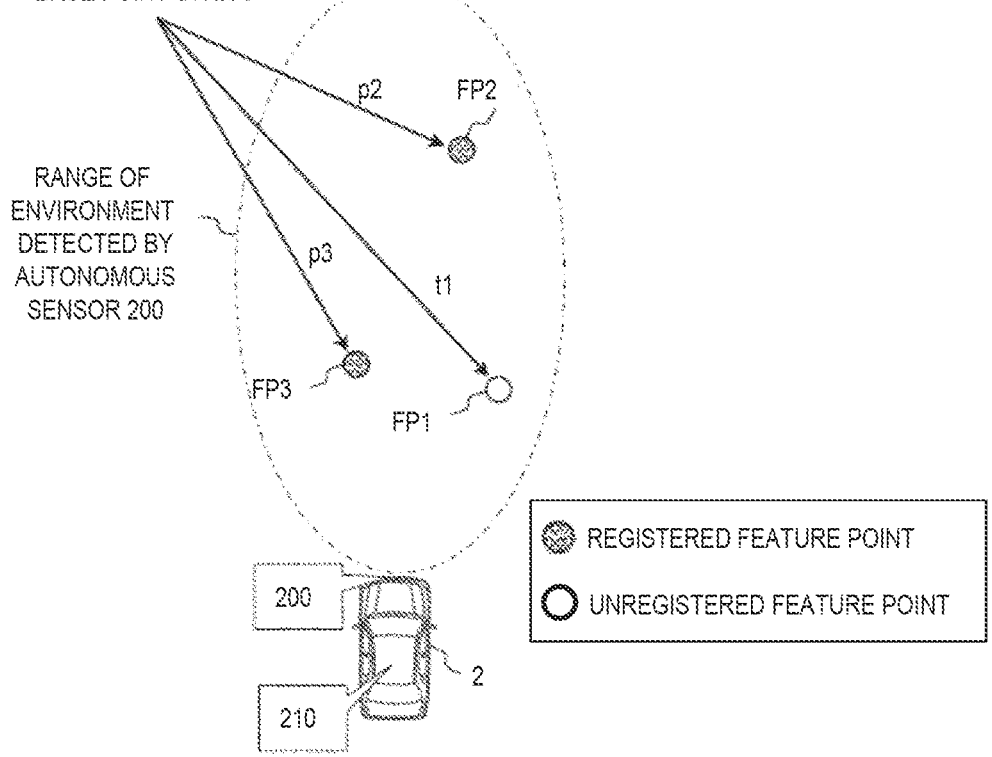
FIG. 11 is a conceptual diagram illustrating a second feature point position calculation process executed by a function evaluation unit according to the second embodiment.

FIG. 11 is a conceptual diagram illustrating the second feature point position calculation process executed by the function evaluation unit 211 according to the second embodiment. FIG. 11 shows a case where the function evaluation unit 211 detects three feature points, FP1, FP2, and FP3, in the second feature point detection process. The feature point FP1 is the second unregistered feature point, and the feature points FP2 and FP3 are the second registered feature points. In the second feature point position calculation process, the function evaluation unit 211 calculates the position of the feature point FP1 on the map, which is the second unregistered feature point, as the second feature point position information.

Details thereof will be described hereinbelow. The function evaluation unit 211 gives position vectors p2 and p3 of the feature points FP2 and FP3, which are the registered feature points, from the map information acquired from the storage device 4. The position of the vehicle 2 on the map is estimated based on the position vectors p2 and p3, and the detection information of the autonomous sensor 200 related to the feature points FP2 and FP3. The position vector t1 of the feature point FP1, which is the unregistered feature point, is calculated, as the second feature point position information, based on the position of the vehicle 2 on the map and the detection information of the autonomous sensor 200 related to the feature point FP1.

In the difference calculation process, the function evaluation unit 211 calculates the difference between the first feature point position information and the second feature point position information, which are related to the same feature point(s) FP.

Details thereof will be described hereinbelow. It is assumed that the function evaluation unit 211 acquires the first feature point position information described in FIG. 10 from the infrastructure device 1 and calculates the second feature point position information described in FIG. 11. It is assumed that the feature points FP1, FP2, and FP3 shown in FIGS. 10 and 11 are the same. Therefore, the function evaluation unit 211 calculates the difference between the first feature point position information and the second feature point position information, which are related to the feature points FP1, FP2, and FP3. That is, the difference Δ between s1 and t1 is calculated. It is calculated using the following equation (3).

[Eq. 3]

$$\Delta = \|s1 - t1\| \quad (3)$$

Since the feature point FP detected by the function evaluation unit 211 does not include the same feature point FP as the feature point FP4 detected by the infrastructure information processing device 110, s4 of the first feature point position information is not considered in the difference calculation process.

As described above, in the sensor evaluation system 10 according to the second embodiment, the first feature point position information and the second feature point position information are different as compared with the sensor evaluation system 10 according to the first embodiment. However, the same advantageous effect as that of the sensor evaluation system 10 according to the first embodiment can be obtained.

3-3. Modified Examples

The sensor evaluation system 10 according to the second embodiment may adopt a modified aspect as follows, similar to the first embodiment.

3-3-1. Modified Example 1

The first feature point position information may include information on a time when the infrastructure sensor 100 detects the information on the position of the feature point related to the first feature point position information (hereinafter, also referred to as "first detection time"). The second feature point position information may include information on a time when the autonomous sensor 200 detects the information on the position of the feature point related to the second feature point position information (hereinafter, also referred to as "second detection time"). The function evaluation unit 211 may calculate a difference between the first feature point position information and the second feature point position information in the difference calculation process, in which the first detection time is equivalent to the second detection time.

3-3-2. Modified Example 2

The vehicle 2 may be a vehicle capable of receiving remote support by an operation of a remote support device located at a distance, and the ECU 210 may make a request to the remote support device for the remote support in a case where the function evaluation unit 211 determines, in the function evaluation process, that the function of the autonomous sensor 200 is abnormal.

4. Third Embodiment

A third embodiment will be described hereinbelow. However, matters already explained will be omitted as appropriate.

4-1. Configuration

Figure 12:
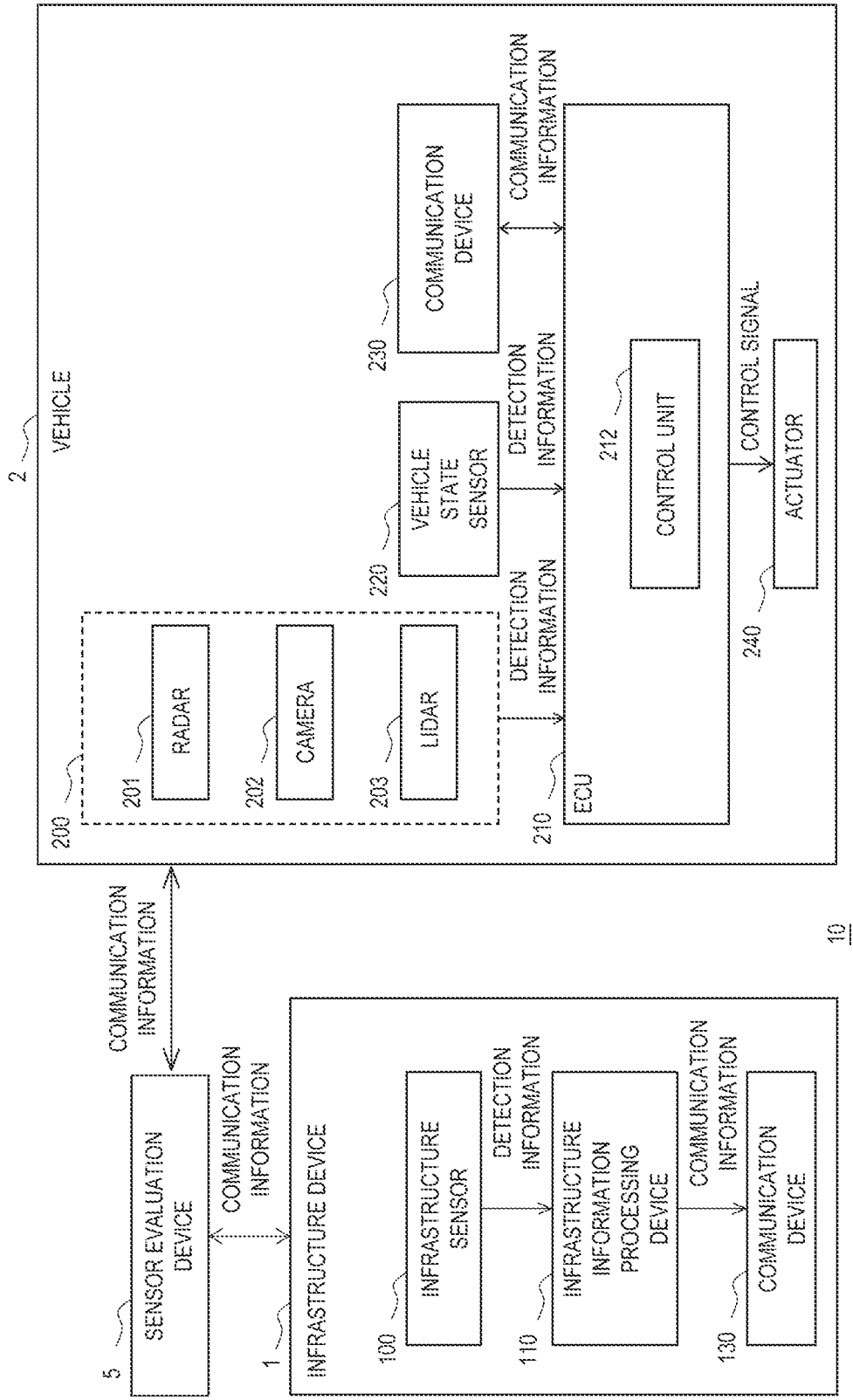
FIG. 12 is a block diagram illustrating a configuration of a sensor evaluation system according to a third embodiment.

The third embodiment shows a case where the autonomous sensor 200 provided in the vehicle 2 is evaluated by a sensor evaluation device. FIG. 12 is a block diagram illustrating a configuration example of the sensor evaluation system 10 according to a third embodiment. The sensor evaluation system 10 includes a sensor evaluation device 5. The configuration of the infrastructure device 1 is the same as that described in the first embodiment. The configuration of the vehicle 2 is the same as that described in the first embodiment, except for the ECU 210. The ECU 210 according to the third embodiment does not include the function evaluation unit 211 described in the first embodiment.

The sensor evaluation device 5 evaluates the autonomous sensor 200 provided in the vehicle 2. The sensor evaluation device 5 is configured to communicate with the vehicle 2 and the infrastructure device 1, and transmit/receive various types of information (communication information). The sensor evaluation device 5 includes a memory, and a processor that executes a program. The sensor evaluation device 5 is typically a server configured on a network to which the vehicle 2 and the infrastructure device 1 are connected.

The sensor evaluation device 5 acquires information on the execution result (including the first feature point position information) of the infrastructure information processing device 110 from the infrastructure device 1. In addition, the detection information of the autonomous sensor 200 is acquired from the vehicle 2. The sensor evaluation device 5 outputs the evaluation result of the autonomous sensor 200 as the processor executes the same process as that described with reference to FIG. 6. The output evaluation result is transmitted to the ECU 210 via communication, and the control unit 212 executes a process according to the evaluation result.

As described above, in the third embodiment, the autonomous sensor 200 provided in the vehicle 2 can be evaluated by the sensor evaluation device 5. The same advantageous effect as that of the first embodiment can be obtained in the third embodiment.

4-3. Modified Example

The sensor evaluation system 10 according to the third embodiment may adopt a modified aspect as follows, similar to the first embodiment.

4-3-1. Modified Example 1

The first feature point position information may include information on a time when the infrastructure sensor 100 detects the information on the position of the feature point related to the first feature point position information (hereinafter, also referred to as "first detection time"). The second feature point position information may include information on a time when the processor detects the information on the position of the feature point related to the second feature point position information (hereinafter, also referred to as "second detection time"). The function evaluation unit 211 may calculate a difference between the first feature point position information and the second feature point position information in the difference calculation process, in which the first detection time is equivalent to the second detection time.

4-3-2. Modified Example 2

The vehicle 2 may be a vehicle capable of receiving remote support by an operation of a remote support device located at a distance, and the ECU 210 may make a request to the remote support device for the remote support in a case where the function evaluation unit 211 determines, in the function evaluation process, that the function of the processor is abnormal.

5. Advantageous Effects

As described above, with the sensor evaluation system 10, the sensor evaluation device 5, and the vehicle 2 according to the present embodiment, it is possible to seamlessly evaluate the function of the autonomous sensor 200 without observing the behavior of the vehicle 2. For example, it is assumed that the position of the vehicle with respect to a stop line cannot be estimated in the autonomous travel control of the vehicle 2 due to the deteriorated function of the autonomous sensor 200. At this time, it is possible to detect the functional deterioration of the autonomous sensor 200 without observing the fact that the vehicle 2 is not stopped well before the stop line.

Furthermore, by acquiring the evaluation result of the function of the autonomous sensor 200, the control unit 212 can evaluate availability and performance of the control function based on the detection information of the autonomous sensor 200.

What is claimed is:

1. A sensor evaluation system which evaluates a sensor which is provided in a vehicle and which is used for detecting an environment around the vehicle, the sensor evaluation system comprising:
an infrastructure device installed outside the vehicle; and
an information processing device, wherein:
the infrastructure device includes an infrastructure sensor that detects the environment around the infrastructure device, and an infrastructure information processing device that performs information processing;
the infrastructure information processing device is configured to execute:
a first feature point detection process of detecting one or more feature points, each indicating a characteristic portion of the environment around the infrastructure device, based on detection information of the infrastructure sensor; and
a first feature point position calculation process of calculating first feature point position information which is information on positions of the one or more feature points detected in the first feature point detection process; and
the information processing device is configured to execute:
a second feature point detection process of detecting the one or more feature points in the environment around the vehicle based on the detection information of the sensor;
a second feature point position calculation process of calculating second feature point position information which is information on positions of the one or more feature points, detected in the second feature point detection process;
a difference calculation process of calculating a difference between the first feature point position information and the second feature point position information associated with the same one or more feature points; and
a function evaluation process of evaluating a function of the sensor based on a magnitude of the difference.

2. The sensor evaluation system according to claim 1, wherein:
the first feature point position information includes information on a first detection time indicating a time when the infrastructure sensor detects the information on the position of the feature point associated with the first feature point position information;
the second feature point position information includes information on a second detection time indicating a time when the sensor detects the information on the position of the feature point associated with the second feature point position information; and
the information processing device is configured to calculate, in the difference calculation process, a difference between the first feature point position information and the second feature point position information in which the first detection time is equivalent to the second detection time.

3. The sensor evaluation system according to claim 1, wherein the information processing device is configured to determine, in the function evaluation process, that the function of the sensor is abnormal in a case where the difference is equal to or larger than a predetermined threshold.

4. The sensor evaluation system according to claim 1, wherein:
the vehicle is a vehicle configured to receive remote support by an operation of a remote support device located at a distance; and
the information processing device is configured to request, in the function evaluation process, the remote support from the remote support device upon being determined that the function of the sensor is abnormal.

5. A sensor evaluation device which evaluates a sensor provided in a vehicle and which is used for detecting an environment around the vehicle, the sensor evaluation device comprising:
a memory that stores a program; and
a processor coupled to the memory,
wherein the processor is configured to, when executing the program, execute:
a process of acquiring detection information of the sensor;
a process of acquiring, from an infrastructure device installed outside the vehicle, first feature point position information which is information on positions of one or more feature points, each indicating a characteristic portion of the environment around the vehicle;
a feature point detection process of detecting the one or more feature points in the environment around the vehicle based on the detection information of the sensor;
a second feature point position calculation process of calculating second feature point position information which is information on positions of the one or more feature points, detected in the feature point detection process;
a difference calculation process of calculating a difference between the first feature point position information and the second feature point position information associated with the same one or more feature points; and
a function evaluation process of evaluating a function of the sensor based on a magnitude of the difference.

6. The sensor evaluation device according to claim 5, wherein:
the first feature point position information includes information on a first detection time indicating a time when the infrastructure device detects the information on the position of the feature point associated with the first feature point position information;
the second feature point position information includes information on a second detection time indicating a time when the sensor detects the information on the position of the feature point associated with the second feature point position information; and
the processor is configured to calculate, in the difference calculation process, a difference between the first feature point position information and the second feature point position information in which the first detection time is equivalent to the second detection time.

7. The sensor evaluation device according to claim 5, wherein the processor is configured to determine, in the function evaluation process, that the function of the sensor is abnormal in a case where the difference is equal to or larger than a predetermined threshold.

8. The sensor evaluation device according to claim 5, wherein:
the vehicle is a vehicle configured to receive remote support by an operation of a remote support device located at a distance; and
in the function evaluation process, the remote support of the remote support device is requested upon determination that the function of the sensor is abnormal.

9. A vehicle comprising:
a sensor that detects an environment around the vehicle; and
an information processing device,
wherein the information processing device is configured to execute:
a process of acquiring detection information from the sensor;
a process of acquiring first feature point position information which is information on positions of one or more feature points, each indicating a characteristic portion of the environment around the vehicle, from an infrastructure device installed outside the vehicle;
a feature point detection process of detecting the one or more feature points in the environment around the vehicle based on the detection information of the sensor;
a second feature point position calculation process of calculating second feature point position information which is information on positions of the one or more feature points;
a difference calculation process of calculating a difference between the first feature point position information and the second feature point position information associated with the same one or more feature points; and
a function evaluation process of evaluating a function of the sensor based on a magnitude of the difference.

10. The vehicle according to claim 9, wherein:
the first feature point position information includes information on a first detection time indicating a time when the infrastructure device detects the information on the position of the feature point associated with the first feature point position information;
the second feature point position information includes information on a second detection time indicating a time when the sensor detects the information on the position of the feature point associated with the second feature point position information; and
the information processing device is configured to calculate, in the difference calculation process, a difference between the first feature point position information and the second feature point position information in which the first detection time is equivalent to the second detection time.

11. The vehicle according to claim 9, wherein the information processing device is configured to determine, in the function evaluation process, that the function of the sensor is abnormal in a case where the difference is equal to or larger than a predetermined threshold.

12. The vehicle according to claim 9, wherein:
the vehicle is configured to receive remote support by an operation of a remote support device located at a distance; and
the information processing device is configured to request, in the function evaluation process, the remote support from the remote support device upon being determined that the function of the sensor is abnormal.

\* \* \* \* \*